United States Patent
Nagaraj et al.

(10) Patent No.: US 7,294,413 B2
(45) Date of Patent: Nov. 13, 2007

(54) SUBSTRATE PROTECTED BY SUPERALLOY BOND COAT SYSTEM AND MICROCRACKED THERMAL BARRIER COATING

(75) Inventors: Bangalore Aswatha Nagaraj, West Chester, OH (US); D. Keith Patrick, Cincinnati, OH (US); Thomas John Tomlinson, West Chester, OH (US); David Walter Parry, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 11/073,529

(22) Filed: Mar. 7, 2005

(65) Prior Publication Data

US 2006/0199032 A1  Sep. 7, 2006

(51) Int. Cl.
  B32B 15/04  (2006.01)
  B32B 15/20  (2006.01)
  C23C 14/00  (2006.01)
  B05D 1/02  (2006.01)
  F01D 5/28  (2006.01)

(52) U.S. Cl. ............... 428/680; 428/652; 428/633; 416/241 R; 427/250; 427/295; 427/453; 427/455

(58) Field of Classification Search ........... 428/632, 428/633, 680, 678, 681, 650, 652, 653, 610; 416/241 R, 248, 204 R, 244 R; 415/232; 427/446, 453, 455, 456, 250, 295, 255.11, 427/419.2, 419.6

See application file for complete search history.

(56) References Cited

U.S. PATENT DOCUMENTS

| | | | |
|---|---|---|---|
| 5,035,958 A | 7/1991 | Jackson et al. | |
| 5,236,745 A | 8/1993 | Gupta et al. | |
| 5,403,669 A | 4/1995 | Gupta et al. | |
| 5,520,516 A | 5/1996 | Taylor et al. | |
| 5,562,998 A * | 10/1996 | Strangman | 428/612 |
| 5,743,013 A | 4/1998 | Taylor et al. | |
| 5,879,753 A | 3/1999 | Zajchowski et al. | |
| 6,180,262 B1 | 1/2001 | Freling et al. | |
| 6,233,822 B1 | 5/2001 | Grossklaus, Jr. et al. | |
| 6,555,179 B1 | 4/2003 | Reeves et al. | |
| 6,607,611 B1 | 8/2003 | Darolia | |
| 6,655,146 B2 | 12/2003 | Kutter et al. | |
| 2004/0115462 A1 | 6/2004 | Grady et al. | |

FOREIGN PATENT DOCUMENTS

| | | |
|---|---|---|
| EP | 0496935 A1 | 8/1992 |
| EP | 1411148 A1 | 4/2004 |

OTHER PUBLICATIONS

European Search Report mailed Jun. 20, 2007.

* cited by examiner

*Primary Examiner*—Michael E. LaVilla
(74) *Attorney, Agent, or Firm*—McNees Wallace & Nurick LLC

(57) ABSTRACT

A protected article includes a substrate having a surface, and a protective system overlying and contacting a first portion of the surface of the substrate. The protective system has a nickel-base superalloy bond coat, an aluminide layer overlying and contacting the bond coat, and a dense vertically microcracked ceramic thermal barrier coating overlying and contacting the aluminide layer.

15 Claims, 2 Drawing Sheets

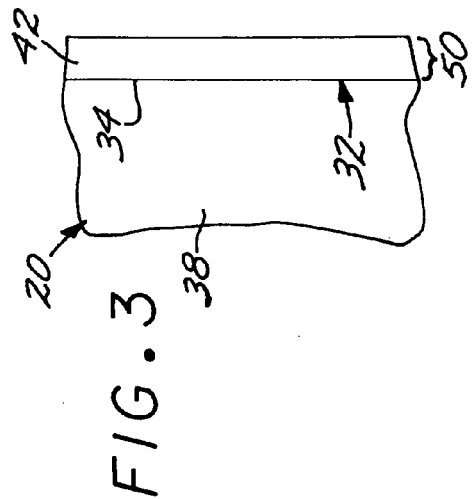
FIG. 3
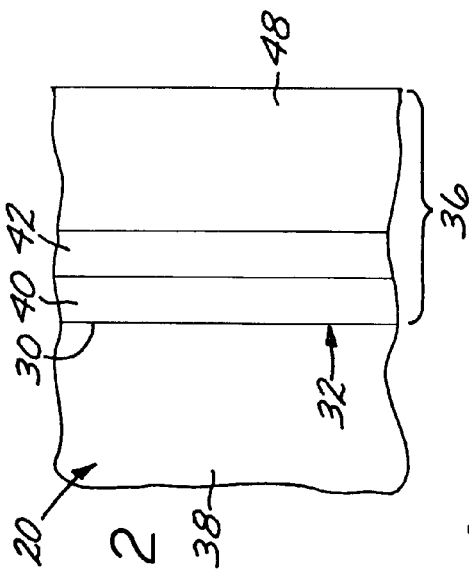
FIG. 2
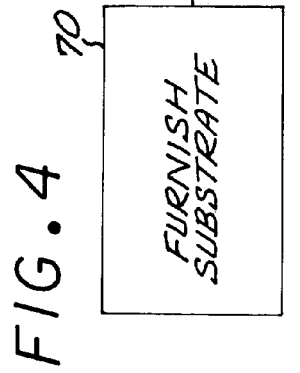
FIG. 4
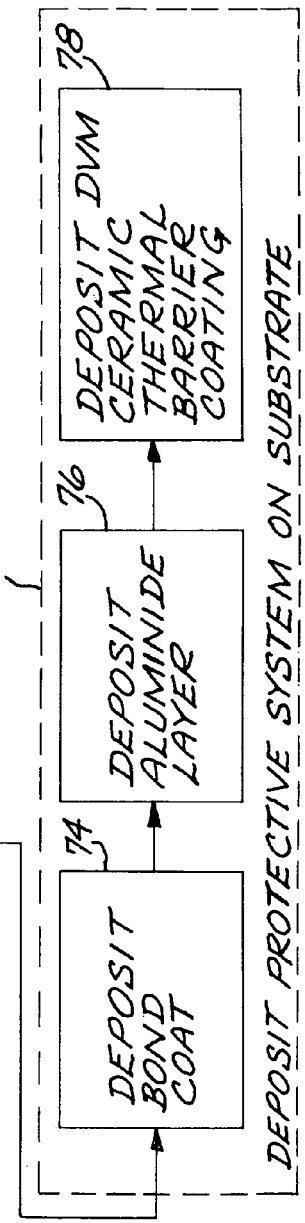

SUBSTRATE PROTECTED BY SUPERALLOY BOND COAT SYSTEM AND MICROCRACKED THERMAL BARRIER COATING

GOVERNMENT RIGHTS

The United States Government may have certain rights in this invention pursuant to Government Contract No. N00019-96-C0176 awarded by the Department of Defense.

This invention relates to the protection of materials used at high temperatures and, more particularly, to bond coat/ceramic thermal barrier coating systems used to protect components of gas turbine engines.

BACKGROUND OF THE INVENTION

In an aircraft gas turbine (jet) engine, air is drawn into the front of the engine, compressed by a shaft-mounted compressor, and mixed with fuel. The mixture is burned to produce hot combustion gas. An annular stationary shroud forms a tunnel-like gas flow path through which the hot combustion gas passes. A gas turbine is located within the volume defined by the stationary shroud and is mounted on the same shaft as the compressor. The flow of combustion gas turns the gas turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot combustion gas, now an exhaust gas, flows from the back of the engine, driving it and the aircraft forward.

The hotter the combustion and exhaust gases, the more efficient is the operation of the jet engine. There is thus an incentive to raise the combustion-gas temperature. The maximum temperature of the combustion gas is normally limited by the materials used to fabricate the stationary shroud and the turbine vanes and turbine blades of the turbine. In current engines, the stationary shroud and the turbine vanes and blades are made of nickel-based superalloys, and can operate at temperatures of up to about 1900-2150° F.

Many approaches have been used to increase the operating temperature limits of stationary shrouds, turbine blades, turbine vanes, and other hot-section components to their current levels. For example, the composition and processing of the base materials themselves have been improved, and a variety of solidification techniques have been developed to take advantage of oriented grain structures and single-crystal structures. Physical cooling techniques, in which cooling air is directed through small holes in the component, may also be used.

In yet another approach, coatings are applied to the surface of the substrate to inhibit the oxidation of the substrate and to insulate the substrate, thereby permitting the substrate material to be used at a higher temperature than would otherwise be possible. The most widely used coatings are aluminum-rich layers whose surfaces oxidize to an aluminum oxide scale to inhibit further oxidation. The aluminum-rich layer may serve as either an environmental coating or as a bond coat under a thermal-insulator ceramic thermal barrier coating. Other types of coatings have also been used, although with less-satisfactory results.

Protective layers continue to be used to protect substrates, but there is always a need for further improvements to increase the operating temperatures of the coated substrates and to prolong their service lives. The present invention fulfills this need, and further provides related advantages.

SUMMARY OF THE INVENTION

The present invention provides a protected article and method for preparing the protected article. This approach is most advantageously utilized for stationary gas-path components such as the turbine stationary shroud, but it may be utilized with other components such as turbine blades and turbine vanes as well. The protective system may be applied to the substrate by known techniques. This approach has been demonstrated to produce superior results to alternative approaches.

A protected article comprises a substrate having a surface, and a protective system overlying and contacting a first portion of the surface of the substrate. The substrate is preferably a nickel-base superalloy such as a component of a gas turbine engine. The protective system comprises a bond coat comprising a layer of a nickel-base superalloy bond coat material contacting the surface of the substrate. The bond coat has a composition different from that of the substrate. An aluminide layer overlies and contacts the bond coat. A dense vertically microcracked ceramic thermal barrier coating overlies and contacts the aluminide layer.

A preferred bond coat material has a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities.

The bond coat preferably has a thermally sprayed microstructure. The aluminide layer preferably is a vapor-deposited diffusion aluminide. The ceramic thermal barrier coating preferably has a composition, in weight percent, of about 6 percent to about 9 percent yttrium oxide, a maximum of about 2.5 percent hafnium oxide, a maximum of about 1.5 percent silicon oxide, less than about 1 percent each of titanium oxide, iron oxide, calcium oxide, aluminum oxide, and magnesium oxide, less than about 2 weight percent total of other oxides, balance zirconium oxide and incidental impurities. The ceramic thermal barrier coating is applied so as to produce the dense vertically microcracked ceramic thermal barrier coating.

A method for preparing a protected article comprises the steps of furnishing a substrate having a surface, and depositing a protective system overlying and contacting a first portion of the surface of the substrate. The protective system comprises a bond coat comprising a layer of a nickel-base superalloy bond coat material contacting the surface of the substrate, wherein the bond coat has a composition different from the substrate, an aluminide layer overlying and contacting the bond coat, and a dense vertically microcracked ceramic thermal barrier coating overlying and contacting the aluminide layer. The bond coat and the ceramic thermal barrier coating are preferably applied by thermal spraying, and the aluminide layer is preferably applied by vapor phase aluminiding. Other compatible features discussed herein may be used with this embodiment.

The present approach improves the performance of the protective system utilizing the dense vertically microcracked ceramic thermal barrier coating. The superalloy bond coat and the aluminide layer, in combination with the dense vertically microcracked ceramic thermal barrier coating, produces improved oxidation resistance and other performance in simulated engine testing as compared with conventional thermal barrier coating systems.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is an enlarged schematic sectional view through the stationary shroud along line 2-2 of FIG. 1;

FIG. 3 is an enlarged schematic sectional view through the stationary shroud along line 3-3 of FIG. 1; and FIG. 4 is a block diagram of an approach for preparing a protected article.

DETAILED DESCRIPTION OF THE INVENTION

Figure 1:
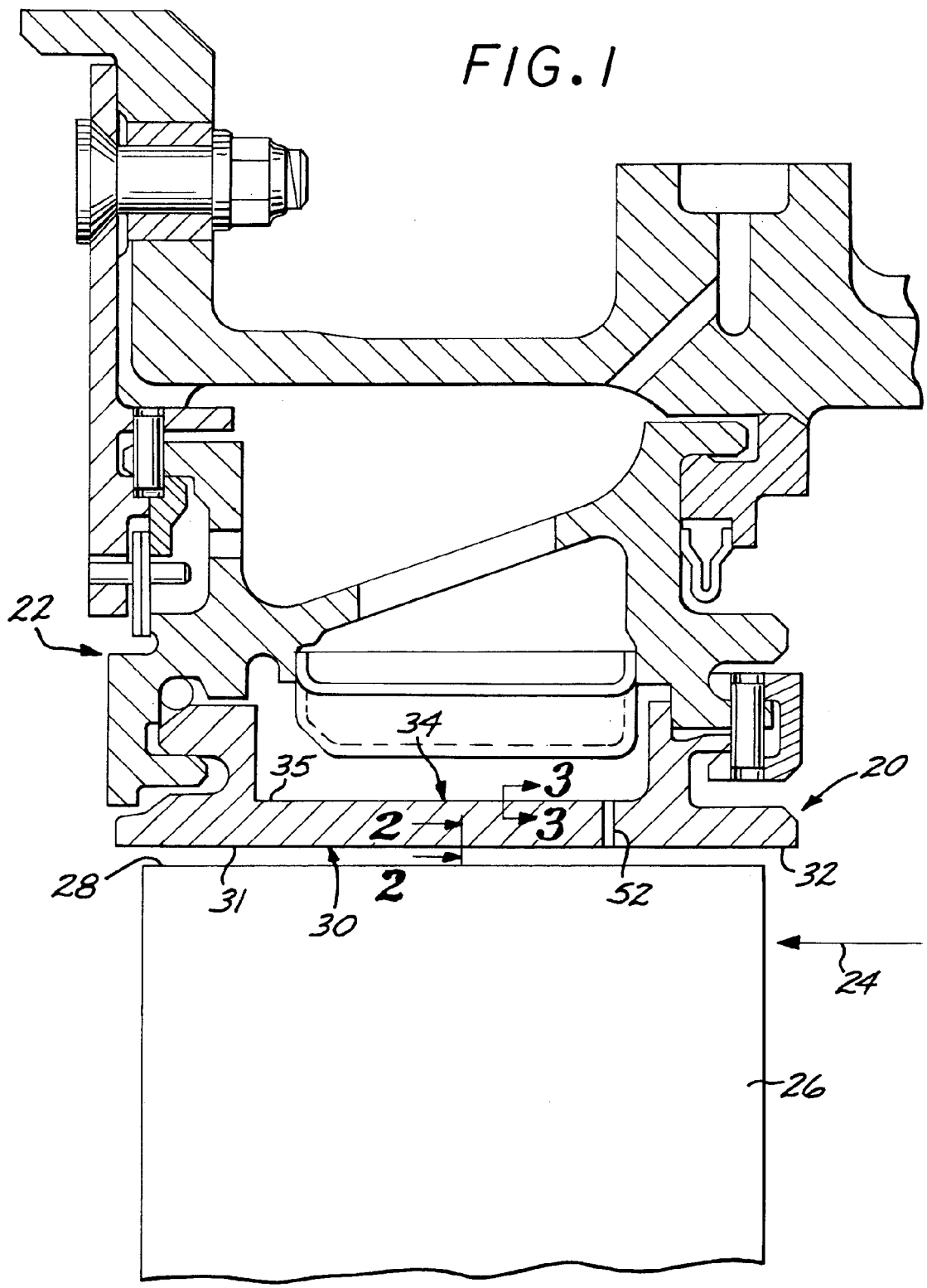
FIG. 1 is a schematic sectional view of a stationary shroud and its support structure, illustrating their relation to a turbine blade.

FIG. 1 depicts a stationary shroud 20, in this case a stationary shroud for the high-pressure gas turbine of a gas turbine engine, and its shroud support 22 by which the stationary shroud 20 is supported from the remainder of the structure of the gas turbine engine. The stationary shroud 20 is formed of a plurality of stationary shroud segments extending around the circumference of the engine, creating an internal annular volume that defines a gas-flow-path 24. Additional features of the stationary shroud 20 and the shroud support 22, except for the protective structure disclosed below, are described in U.S. Pat. No. 6,233,822, whose disclosure is incorporated herein by reference in its entirety. The preferred utilization of the present approach is with the turbine stationary shroud, but it may be used in other applications such as turbine blades, turbine vanes, and combustor components of gas turbine engines.

A turbine blade 26 is supported on a rotating shaft (not shown) so that it rotates in a direction that takes it into and out of the plane of the illustration. A tip 28 of the turbine blade 26 faces a first portion 30 of a surface 32 of the stationary shroud 20. In this preferred embodiment, the first portion 30 is a hot-gas flow-path surface 31 of the stationary shroud 20, which is exposed to the hot combustion gas in the gas flow path 24. A second portion 34 of the surface 32 of the stationary shroud 20 is the non-flow-path surface 35 in this preferred embodiment, and constitutes at least part of the remainder of the surface 32 of the stationary shroud 20.

The first portion 30 of the surface 32 is protected by a protective system 36 illustrated in FIG. 2. (FIGS. 2 and 3 are not drawn to scale.) The body of the stationary shroud 20 serves as a substrate 38 upon which the protective system 36 is deposited. The substrate 38 (i.e., the stationary shroud 20) is preferably a cobalt-base superalloy, which has more cobalt than any other element, or a nickel-base alloy, which has more nickel than any other element. A preferred cobalt-base alloy is Mar-M-509™, having a nominal composition in weight percent of about 23.5 percent chromium, about 10.0 percent nickel, about 7.0 percent tungsten, about 3.5 percent tantalum, about 0.6 percent carbon, about 0.5 percent zirconium, about 0.2 percent titanium, balance cobalt and minor elements. The substrate 38 even more preferably is a nickel-base superalloy, which in its heat-treated condition is strengthened by the presence of precipitates of gamma prime or a related phase. A preferred nickel-base superalloy is Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements, or Rene™ N2, having a nominal composition in weight percent as defined in US Patent Application 2004/0109786, whose disclosure is incorporated by reference in its entirety.

The protective system 36 overlies and contacts the first portion 30 of the surface 32 of the substrate 38, which in this case is the hot-gas flow-path surface 31. The protective system 36 comprises a bond coat 40, which itself is a layer of a nickel-base superalloy bond coat material that contacts the surface 32 of the substrate 38. The bond coat 40 has a composition different from that of the substrate 38. A first preferred bond coat material has a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities. A second preferred bond coat material has a nominal composition, in weight percent, of about 9 percent chromium, about 4 percent cobalt, about 6 percent aluminum, about 0.03 percent yttrium, about 5 percent tantalum, about 1.4 percent rhenium, about 4.5 percent tungsten, about 1.5 percent molybdenum, about 0.9 percent hafnium, about 0.5 percent carbon, balance nickel and incidental impurities. The bond coat 40 is preferably from about 0.004 inch to about 0.020 inch thick.

The protective system 36 further includes an aluminide layer overlying and contacting the bond coat 40. The aluminide layer 42 is preferably a diffusion aluminide such as a simple diffusion aluminide or a complex diffusion aluminide such as a platinum aluminide. The structure, composition, and method of application of simple and complex aluminides are discussed more fully in U.S. Pat. No. 6,607,611, whose disclosure is incorporated herein by reference in its entirety. The aluminide layer is preferably from about 0.0005 inch to about 0.0045 inch thick.

A dense vertically microcracked (DVM) ceramic thermal barrier coating (TBC) 48 overlies and contacts the aluminide layer 42. The DVM ceramic thermal barrier coating 48 preferably has a composition, in weight percent, of 6 percent to 9 percent yttrium oxide, a maximum of 2.5 percent hafnium oxide, a maximum of 1.5 percent silicon oxide, less than 1 percent each of titanium oxide, iron oxide, calcium oxide, aluminum oxide, and magnesium oxide, less than 2 weight percent total of other oxides, balance zirconium oxide and incidental impurities. The structure and application of the DVM TBC are discussed more fully in U.S. Pat. Nos. 5,520,516; 5,743,013; 5,879,753; and 6,180,262, whose disclosures are incorporated herein by reference in their entireties. The DVM TBC 48 is preferably from about 0.010 inch to about 0.080 inch thick.

The protective system 36 is applied to and protects only the first portion 30 of the surface 32 of the stationary shroud 20, which in the preferred embodiment is the hot-gas flow-path surface 31. Other parts of the surface 32 of the stationary shroud 20, and specifically the second portion 34 which is the non-flow-path surface 35 in this case, may also require protection against oxidation but do not require the use of the DVM TBC 48. A second protective system 50, as illustrated in FIG. 3, may be used to protect this second portion 34 of the surface 32. In the second protective system 50 of FIG. 3, a second aluminide layer overlies and contacts the second portion 34 of the surface 32, the non-flow-path surface in this case. It is preferred that the second protective system 50 has no bond coat and no thermal barrier coating. It is preferred that the second aluminide layer on the second portion 34 is the same aluminide layer 42 as on the first portion 30, as illustrated in FIG. 3. However, other operable methods to protect the second portion 34 may be used as well.

FIG. 4 is a flow chart depicting a preferred method for protecting an article substrate according to the present approach. The method will be described in the context of applying both the protective system 36 to the first portion 30 of the surface 32 and the second protective system 50 to the second portion 34 of the surface 32. The prior description of the individual elements of the structure is incorporated herein.

The method for preparing a protected article comprises first furnishing the substrate 38 having the surface 32, step 70. The protective systems 36 and 50 are then deposited, step 72. The first protective system 36 is deposited overlying and contacting the first portion 30 of the surface 32 of the substrate 38, and the second protective system 50 is deposited overlying and contacting the second portion 34 of the surface 32 of the substrate 38.

To deposit the protective systems 36 and 50, the bond coat 40 is deposited overlying and contacting only the first portion 30, and not the second portion 34, step 74. The bond coat 40 is preferably applied by a thermal spray approach, preferably low pressure plasma spray (LPPS), shrouded arc, or high velocity oxy-fuel (HVOF), or otherwise by air plasma spray (APS). The bond coat 40 is preferably from about 0.004 inch to about 0.020 inch thick, most preferably from about 0.006 inch to about 0.010 inch thick.

The aluminide layer 42 is deposited overlying the bond coat 40 on the first portion 30, and the aluminide layer 42 is deposited overlying and contacting the second portion 34 of the surface 32 of the substrate 38, step 76. Most conveniently, the aluminide layer 42 is deposited simultaneously over the first portion 30 and the second portion 34 by any operable vapor phase aluminiding technique. Operable techniques for depositing the aluminum-rich layer include, for example, above-the-pack aluminiding or chemical vapor deposition. If a complex aluminide is to be used, additional constituents are deposited. For example, if the aluminide layer 42 is to be platinum aluminides, a platinum layer is deposited before the aluminum-rich layer is deposited. These techniques are discussed more fully in the '611 patent.

If the substrate has small-diameter openings therein that are to remain open, such as cooling holes 52 (FIG. 1), it is strongly preferred that the vapor phase aluminiding technique be used. If pack aluminiding is used, the powder particles may lodge in the small openings and prevent gas flow therethrough. If, however, there are no such small-diameter openings, pack aluminiding processes may be used.

The dense vertically microcracked ceramic thermal barrier coating 48 is deposited overlying only the aluminide layer 42 on only the first portion 30 of the surface 32 of the substrate 38, step 78. No ceramic thermal barrier coating is deposited over the second portion 34 of the surface 32 of the substrate 38. The dense vertically microcracked ceramic thermal barrier coating 48 is preferably deposited by a thermal spray technique such as air plasma spray.

The present approach has been reduced to practice and comparatively tested against the closest prior approach, in each case using a dense vertically microcracked ceramic thermal barrier coating. Multiple test specimens were prepared according to the present approach with the preferred embodiment of the protective system 36 as described herein, using the described bond coat 40 having a thickness of from 0.006 to 0.010 inches, the simple diffusion aluminide layer 42 having a thickness of from 0.001 inch to 0.0035 inch, and the DVM TBC 48 having a thickness of 0.015 inch to 0.025 inch. Multiple conventional baseline test specimens were prepared using a NiCrAlY bond coat having a composition, in weight percent, of about 22 percent chromium, about 10 percent aluminum, about 1 percent yttrium, balance nickel and impurities, and a thickness of about 0.010 inches, and a dense vertically microcracked ceramic thermal barrier coating having a thickness of about 0.020 inch, but with no aluminide layer. The substrate was Rene N5 for all specimens.

The specimens were prepared in two groups, each with two subsets of samples. One subset of each group was coated with the coating system of the invention as set forth herein, and the other subset of each group was coated with the air plasma sprayed NiCrAlY and DVM TBC.

The specimens of the first group were tested for spallation life in furnace cycle testing at 2075° F. The present coating system showed an average spallation life of 435 cycles, as compared with an average life of 325 cycles for the conventional approach.

The specimens of the second group were tested in cyclic oxidation in Mach 1 gas speed at 2200° F./20 cycles per hour to evaluate the oxidation capability of the bond coat. The first subset of specimens ran 300 hours before testing was stopped without the specimens failing, and the second subset of specimens ran an average of 41 hours before failure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A protected article comprising:
   a substrate having a surface; and
   a protective system overlying and contacting a first portion of the surface of the substrate, wherein the protective system comprises
      a bond coat comprising a layer of a nickel-base superalloy bond coat material contacting the surface of the substrate, wherein the bond coat has a composition different from that of the substrate,
      an aluminide layer overlying and contacting the bond coat, and
      a dense vertically microcracked ceramic thermal barrier coating overlying and contacting the aluminide layer.

2. The protected article of claim 1, wherein the substrate is a nickel-base superalloy.

3. The protected article of claim 1, wherein the substrate is a cobalt-base superalloy.

4. The protected article of claim 1, wherein the substrate is a component of a gas turbine engine.

5. The protected article of claim 1, wherein the substrate is a stationary turbine shroud of a gas turbine engine.

6. The protected article of claim 1, wherein the bond coat material has a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities.

7. The protected article of claim 1, wherein the bond coat material has a nominal composition, in weight percent, of about 9 percent chromium, about 4 percent cobalt, about 6 percent aluminum, about 0.03 percent yttrium, about 5 percent tantalum, about 1.4 percent rhenium, about 4.5 percent tungsten, about 1.5 percent molybdenum, about 0.9 percent hafnium, about 0.5 percent carbon, balance nickel and incidental impurities.

8. The protected article of claim 1, wherein the bond coat has a thermally sprayed microstructure.

9. The protected article of claim 1, wherein the aluminide layer is a diffusion aluminide.

10. The protected article of claim 1, wherein the ceramic thermal barrier coating has a composition, in weight percent, of about 6 percent to about 9 percent yttrium oxide, a maximum of about 2.5 percent hafnium oxide, a maximum of about 1.5 percent silicon oxide, less than about 1 percent each of titanium oxide, iron oxide, calcium oxide, aluminum oxide, and magnesium oxide, less than about 2 weight percent total of other oxides, balance zirconium oxide and incidental impurities.

11. The protected article of claim 1, further including
a second protective system overlying and contacting a second portion of the surface of the substrate, wherein the second protective system comprises
a second aluminide layer overlying and contacting the second portion of the surface of the substrate, and wherein the second protective system has no bond coat and no ceramic thermal barrier coating.

12. A method for preparing a protected article, comprising the steps of
furnishing a substrate having a surface; and
depositing a protective system overlying and contacting a first portion of the surface of the substrate, wherein the protective system comprises
a bond coat comprising a layer of a nickel-base superalloy bond coat material contacting the surface of the substrate, wherein the bond coat has a composition different from that of the substrate,
an aluminide layer overlying and contacting the bond coat, and
a dense vertically microcracked ceramic thermal barrier coating overlying and contacting the aluminide layer.

13. The method of claim 12, wherein the step of depositing includes the step of
thermally spraying the bond coat.

14. The method of claim 12, wherein the step of depositing includes the step of
applying the aluminide layer by vapor phase aluminiding.

15. The method of claim 12, wherein the step of depositing includes the step of
thermally spraying the ceramic thermal barrier coating.

* * * * *